United States Patent
Khlat et al.

(10) Patent No.: US 7,724,805 B1
(45) Date of Patent: May 25, 2010

(54) FAST RMS MEASUREMENT OF INPUT I/Q SIGNALS IN A W-CDMA SYSTEM

(75) Inventors: Nadim Khlat, Cugnaux (FR); David Myara, Toulouse (FR)

(73) Assignee: RF Micro Devices, Inc., Greensboro, NC (US)

( * ) Notice: Subject to any disclaimer, the term of this patent is extended or adjusted under 35 U.S.C. 154(b) by 871 days.

(21) Appl. No.: 11/470,340

(22) Filed: Sep. 6, 2006

(51) Int. Cl.
*H04L 27/36* (2006.01)
*H04B 1/00* (2006.01)

(52) U.S. Cl. .................................. 375/146; 375/298
(58) Field of Classification Search ............... 375/146, 375/140, 130; 370/319; 342/150
See application file for complete search history.

(56) References Cited

U.S. PATENT DOCUMENTS

| | | | | |
|---|---|---|---|---|
| 5,864,577 | A * | 1/1999 | Ramel ........................ | 375/130 |
| 6,480,528 | B1 * | 11/2002 | Patel et al. ................. | 375/148 |
| 2003/0142686 | A1 * | 7/2003 | Kim ........................... | 370/418 |
| 2006/0109938 | A1 * | 5/2006 | Challa et al. ............... | 375/347 |
| 2006/0123075 | A1 * | 6/2006 | Mallinson ................... | 708/422 |
| 2006/0239380 | A1 | 10/2006 | Khlat et al. | |
| 2006/0249497 | A1 * | 11/2006 | Myers et al. ............. | 219/130.5 |
| 2007/0070876 | A1 * | 3/2007 | Yeh ............................ | 370/208 |

* cited by examiner

*Primary Examiner*—David C Payne
*Assistant Examiner*—Brian J Stevens
(74) *Attorney, Agent, or Firm*—Withrow & Terranova, P.L.L.C.

(57) ABSTRACT

A system and method are provided for quickly measuring the Root Mean Square (RMS) value of digital quadrature signals (I, Q) input to a Wideband Code Division Multiple Access (W-CDMA) transmitter. In general, in a W-CDMA transmitter such as that in a Universal Mobile Telecommunications System (UMTS), multiple channels are combined to provide the digital quadrature signal (I, Q) input to the transmitter. The RMS value of the digital quadrature signal (I, Q) may be determined using a number of consecutive samples of the digital quadrature signal (I, Q) over a period corresponding to mutually orthogonal segments of the spreading codes used for the transmitted channels. As a result of the mutual orthogonality of the segments of the spreading codes, a residual error of the RMS measurement is equal to zero, thereby providing an accurate RMS measurement in much less time than required by traditional RMS measurement schemes.

16 Claims, 8 Drawing Sheets

| CASE | CHANNEL | BRANCH | OVSF CODE | SF | OVSF PATTERN | MINIMUM MUTUAL ORTHOGONALITY LENGTH |
|---|---|---|---|---|---|---|
| CASE 1 | DPCCH | Q | CCH,256,0 | 256 | 111.....111 | 8 |
|  | HS-DPCCH | Q | CCH,256,33 | 256 | 1111-1-1-1-1...1-1-1-1-1-11111... |  |
| CASE 2 | DPCCH | Q | CCH,256,0 | 256 | 111......111 | 4 |
|  | DPDCH1 | I | CCH,X,X/4 | X | 11-1-1...11-1-1 |  |
|  | HS-DPCCH | Q | CCH,256,64 | 256 | 11-1-1...11-1-1 |  |
| CASE 3 | DPCCH | Q | CCH,256,0 | 256 | 111......111 | 4 |
|  | DPDCH1 | I | CCH,4,1 | 4 | 11-1-1 |  |
|  | DPDCH2 | Q | CCH,4,1 | 4 | 11-1-1 |  |
|  | DPDCH3 | I | CCH,4,3 | 4 | 1-1-11 |  |
|  | DPDCH4 | Q | CCH,4,3 | 4 | 1-1-11 |  |
|  | DPDCH5 | I | CCH,4,2 | 4 | 1-11-1 |  |
|  | DPDCH6 | Q | CCH,4,2 | 4 | 1-11-1 |  |
|  | HS-DPCCH | I | CCH,256,1 | 256 | 111...11-1-1-1...1 |  |
| CASE 4 | DPCCH | Q | CCH,256,0 | 256 | 111......111 | 8 |
|  | DPDCH1 | I | CCH,4,1 | 4 | 11-1-1 |  |
|  | DPDCH2 | Q | CCH,4,1 | 4 | 11-1-1 |  |
|  | DPDCH3 | I | CCH,4,3 | 4 | 1-1-11 |  |
|  | DPDCH4 | Q | CCH,4,3 | 4 | 1-1-11 |  |
|  | DPDCH5 | I | CCH,4,2 | 4 | 1-11-1 |  |
|  | HS-DPCCH | Q | CCH,256,32 | 256 | 1111-1-1-1-1...1 |  |

FIG. 5A

| CASE | CHANNEL | BRANCH | OVSF CODE | SF | OVSF PATTERN | MINIMUM MUTUAL ORTHOGONALITY LENGTH |
|---|---|---|---|---|---|---|
| CASE 5 | DPCCH | Q | CCH,256,0 | 256 | 111......111 | 8 |
| | E-DPCCH | I | CCH,256,1 | 256 | 111...11-1-1-1...-1 | |
| | E-DPDCH1 | I | CCH,X,X/4 OR CCH,2,1 | X OR 2 | 11-1-1...11-1-1 OR 1-1 | |
| | E-DPDCH2 | Q | CCH,4,1 OR CCH,2,1 | 4 OR 2 | 11-1-1 OR 1-1 | |
| | E-DPDCH3 | I | CCH,4,1 | 4 | 11-1-1 | |
| | E-DPDCH4 | Q | CCH,4,1 | 4 | 11-1-1 | |
| | HS-DPCCH | Q | CCH,256,33 | 256 | 1111-1-1-1-1...1-1-1-1-11111... | |
| CASE 6 | DPCCH | Q | CCH,256,0 | 256 | 111......111 | 4 |
| | DPCCH | I | CCH,X,X/4 | X | 11-1-1...11-1-1 | |
| | E-DPCCH | I | CCH,256,1 | 256 | 111...11-1-1-1...-1 | |
| | E-DPDCH1 | Q | CCH,X,X/2 | X | 1-1... | |
| | E-DPDCH2 | I | CCH,4,2 OR CCH,2,1 | 4 OR 2 | 1-11-1 OR 1-1 | |
| CASE 7 | DPCCH | Q | CCH,256,0 | 256 | 111......111 | 4 |
| | DPDCH | I | CCH,X,X/4 | X | 11-1-1...11-1-1 | |
| | E-DPCCH | I | CCH,256,1 | 256 | 111...11-1-1-1...-1 | |
| | E-DPDCH1 | Q | CCH,X,X/2 | X | 1-1... | |
| | E-DPDCH2 | Q | CCH,4,2 OR CCH,2,1 | 4 OR 2 | 1-11-1 OR 1-1 | |
| | HS-DPCCH | Q | CCH,256,64 | 256 | 11-1-1...11-1-1 | |

*FIG. 5B*

| CASE | CHANNEL | BRANCH | OVSF CODE | SF | OVSF PATTERN | MINIMUM MUTUAL ORTHOGONALITY LENGTH |
|---|---|---|---|---|---|---|
| CASE 8 | PRACH CONTROL | I | CCH,256,16,S+15 | 256 | - | 1 |
| | PRACH DATA | Q | CCH,X,X,S/16 | X | - | |
| CASE 9 | PRACH PREAMB | I/Q | - | - | - | 1 |
| CASE 10 | PCPCH CONTROL | Q | CCH,256,0 | 256 | 111......111 | 1 |
| | PCPCH DATA | I | CCH,X,X/4 | X | 11-1-1...11-1-1 | |
| CASE 11 | PCPCH PREAMB | I/Q | - | - | - | 1 |

FAST RMS MEASUREMENT OF INPUT I/Q SIGNALS IN A W-CDMA SYSTEM

FIELD OF THE INVENTION

The present invention relates to a Wideband Code Division Multiple Access (W-CDMA) transmitter and more specifically relates to a system and method for measuring the Root Mean Square (RMS) value of digital quadrature signals (I, Q) input to a W-CDMA transmitter.

BACKGROUND OF THE INVENTION

Battery-life, or efficiency, is a primary consideration when designing a mobile transmitter. One method of increasing the battery-life is to decrease current consumption of the transmitter during low power operation by decreasing the bias current. Changing the bias current of the transmitter also changes the gain, and thus the power step, of the transmitter. Thus, in order to achieve a target output power, it is desirable to have a power control system that corrects the gain of the transmitter after a change in bias current.

Traditional power control systems use a closed loop architecture where the output of the transmitter is coupled to a power detector. In order to measure the gain, the power detector uses an averaging filter that requires approximately 200 microseconds to remove the amplitude modulation from the detected signal. However, unlike the Global System for Mobile Communications (GSM), continuous time transmit schemes such as the Wideband Code Division Multiple Access (W-CDMA) modulation scheme of the Universal Mobile Telecommunications System (UMTS) require that mobile terminals continuously transmit in each transmit slot. Further, for W-CDMA in the UMTS, any gain adjustments must be completed within approximately the first 50 microseconds of each time slot. Accordingly, the traditional power control systems are not suitable for measuring and adjusting the gain of the W-CDMA transmitter during the first 50 microseconds of a time slot.

One solution would be to use traditional power control systems to detect the gain in one time slot and adjust the gain in the next time slot. However, the bias current may change from one time slot to the next. As such, correcting the gain for one time slot based on the gain during the previous time slot is not desirable.

Commonly owned and assigned U.S. patent application Ser. No. 11/113,873, entitled POWER CONTROL SYSTEM FOR A CONTINUOUS TIME MOBILE TRANSMITTER, which was filed Apr. 25, 2005 and is hereby incorporated herein by reference in its entirety, discloses a system for controlling the output power of a continuous time mobile transmitter by controlling the gain of the transmitter that addresses the issues discussed above. In this system and other systems controlling output power by controlling the gain of the transmitter, the output power of the transmitter is a function of both the RMS value of the input signal as well as the gain of the transmitter ($P_{out}$=Gain×$RMS_{IN}$).

W-CDMA in the UMTS provides multi-code operation which may result in variations in the Root Mean Square (RMS) value of the input signals provided to the transmitter. More specifically, by using orthogonal spreading codes, multiple channels may be combined to provide a digital input signal to the transmitter. However, due to changes in the number of combined channels, which channels are combined, and the gains applied to the channels, the RMS value of the input signal provided to the transmitter may vary. Thus, in order to provide accurate power control by controlling gain, there is a need for a system that corrects or compensates for variations in the RMS value of the input signal provided to the transmitter.

In order to compensate for variations in the RMS value of the input signal, some baseband processor manufacturers scale the input signal and provide the scaled input signal to the transmitter. However, due to errors inherent in the scaling process such as digital multiplication and bit resolution, the RMS value of the scaled input signal may still vary significantly. Thus, even in these systems, there is a need for a system and method for correcting compensating for variations in the RMS value of the input signal provided to the transmitter.

SUMMARY OF THE INVENTION

The present invention provides a system and method for quickly measuring the Root Mean Square (RMS) value of digital quadrature signals (I, Q) input to a Wideband Code Division Multiple Access (W-CDMA) transmitter. In general, in a W-CDMA transmitter such as that in a Universal Mobile Telecommunications System (UMTS), multiple channels having orthogonal spreading codes are combined to provide the digital quadrature signal (I, Q) input to the transmitter. The RMS value of the digital quadrature signal (I, Q) may be determined using a number of consecutive samples of the digital quadrature signal (I, Q) over a period corresponding to mutually orthogonal segments of the spreading codes used for the transmitted channels. For example, for a W-CDMA transmitter in the UMTS, the mutually orthogonal segments of the spreading codes are 8 chip segments of the spreading codes starting with the first chip of the spreading codes or some multiple of 8 chips from the beginning of the spreading codes. As a result of the mutual orthogonality of the segments of the spreading codes, a residual error of the RMS measurement is equal to zero, thereby providing an accurate measurement of the RMS value of the digital quadrature signal (I, Q) in much less time than required by traditional RMS measurement schemes.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
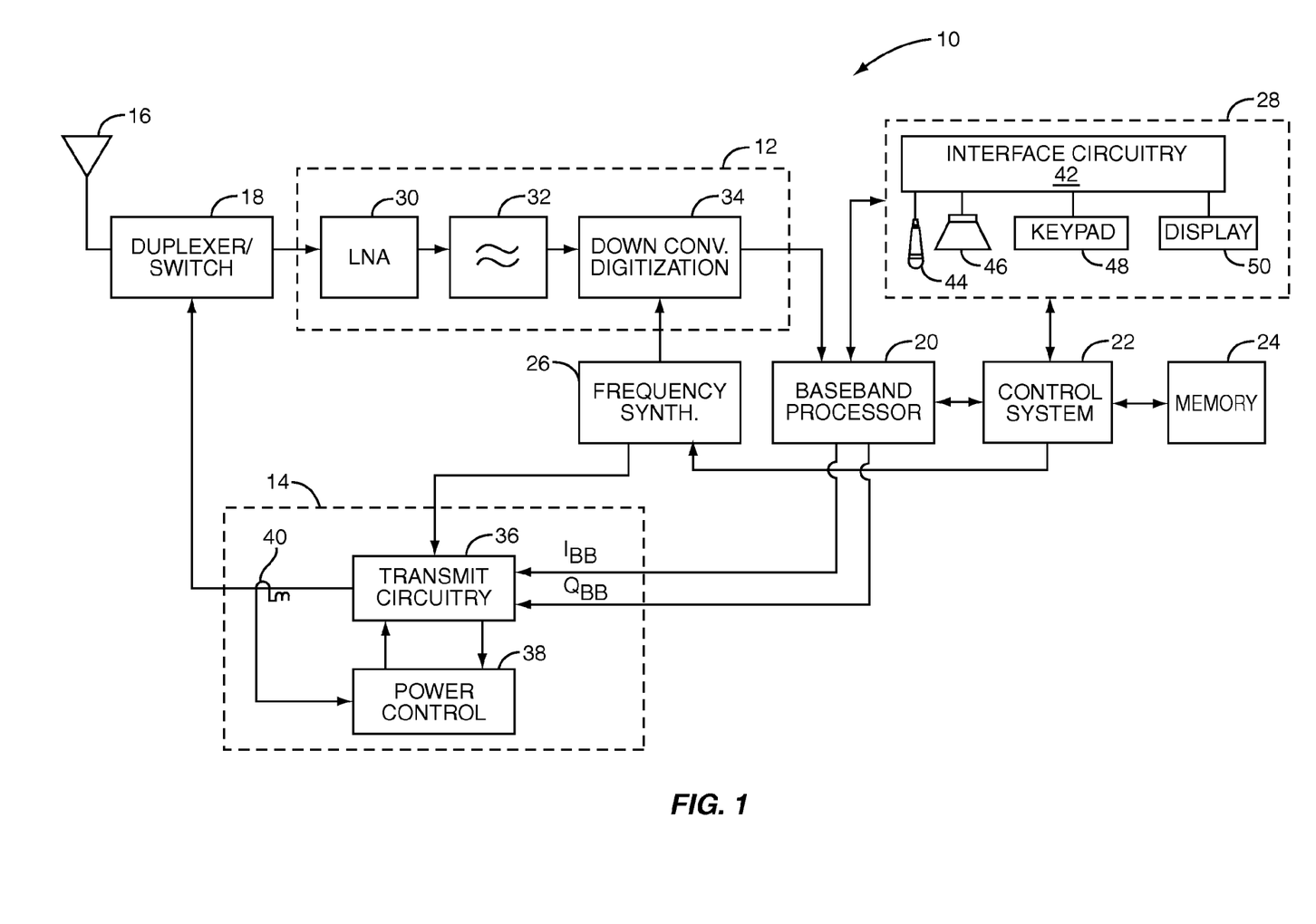
FIG. 1 is a block diagram of an exemplary mobile terminal including a transmitter incorporating a system and method for quickly measuring the Root Mean Square (RMS) value of digital quadrature signals (I, Q) input to the transmitter according to one embodiment of the present invention.

The present invention may be implemented a mobile terminal such as a mobile telephone, Personal Digital Assistant (PDA), or the like. A block diagram of an exemplary mobile terminal 10 is illustrated in FIG. 1. In general, the mobile terminal 10 includes a receiver front end 12, a radio frequency transmitter section 14, an antenna 16, a duplexer or switch 18, a baseband processor 20, a control system 22, memory 24, a frequency synthesizer 26, and an interface 28. The receiver front end 12 receives information-bearing radio frequency signals from one or more remote transmitters provided by a base station (not shown). A low noise amplifier 30 amplifies the signal. A filter circuit 32 minimizes broadband interference in the received signal, while downconversion and digitization circuitry 34 downconverts the filtered, received signal to an intermediate or baseband frequency signal, and digitizes the intermediate frequency or baseband frequency signal into one or more digital streams. The receiver front end 12 typically uses one or more mixing frequencies generated by the frequency synthesizer 26.

The baseband processor 20 processes the digitized, received signal to extract the information or data bits conveyed in the received signal. This processing typically comprises demodulation, decoding, and error correction operations. As such, the baseband processor 20 is generally implemented in one or more digital signal processors (DSPs).

On the transmit side, the baseband processor 20 receives digitized data from the control system 22, which it encodes for transmission. The control system 22 may run software stored in the memory 24. Alternatively, the operation of the control system 22 may be a function of sequential logic structures as is well understood. After encoding the data from the control system 22, the baseband processor 20 outputs the encoded data to the radio frequency transmitter section 14. As illustrated, the encoded data is output to the radio frequency transmitter section 14 as a digital quadrature baseband signal $(I_{BB}, Q_{BB})$.

The radio frequency transmitter section 14 generally includes transmit circuitry 36 and power control circuitry 38. The transmit circuitry 36 operates to convert the baseband signal $(I_{BB}, Q_{BB})$ into an analog signal, upconvert the analog signal to a desired radio frequency, and to amplify the upconverted signal to a desired output power level for transmission via the antenna 16. The power control circuitry 38 is coupled to an output of the transmit circuitry 36 via a coupler 40 and operates to control the output power level of the transmit circuitry 36.

A user may interact with the mobile terminal 10 via the interface 28, which may include interface circuitry 42 associated with a microphone 44, a speaker 46, a keypad 48, and a display 50. The interface circuitry 42 typically includes analog-to-digital converters, digital-to-analog converters, amplifiers, and the like. Additionally, it may include a voice encoder/decoder, in which case it may communicate directly with the baseband processor 20.

The microphone 44 will typically convert audio input, such as the user's voice, into an electrical signal, which is then digitized and passed directly or indirectly to the baseband processor 20. Audio information encoded in the received signal is recovered by the baseband processor 20, and converted into an analog signal suitable for driving speaker 46 by the interface circuitry 42. The keypad 48 and display 50 enable the user to interact with the mobile terminal 10, input numbers to be dialed and address book information, or the like, as well as monitor call progress information.

Figure 2:
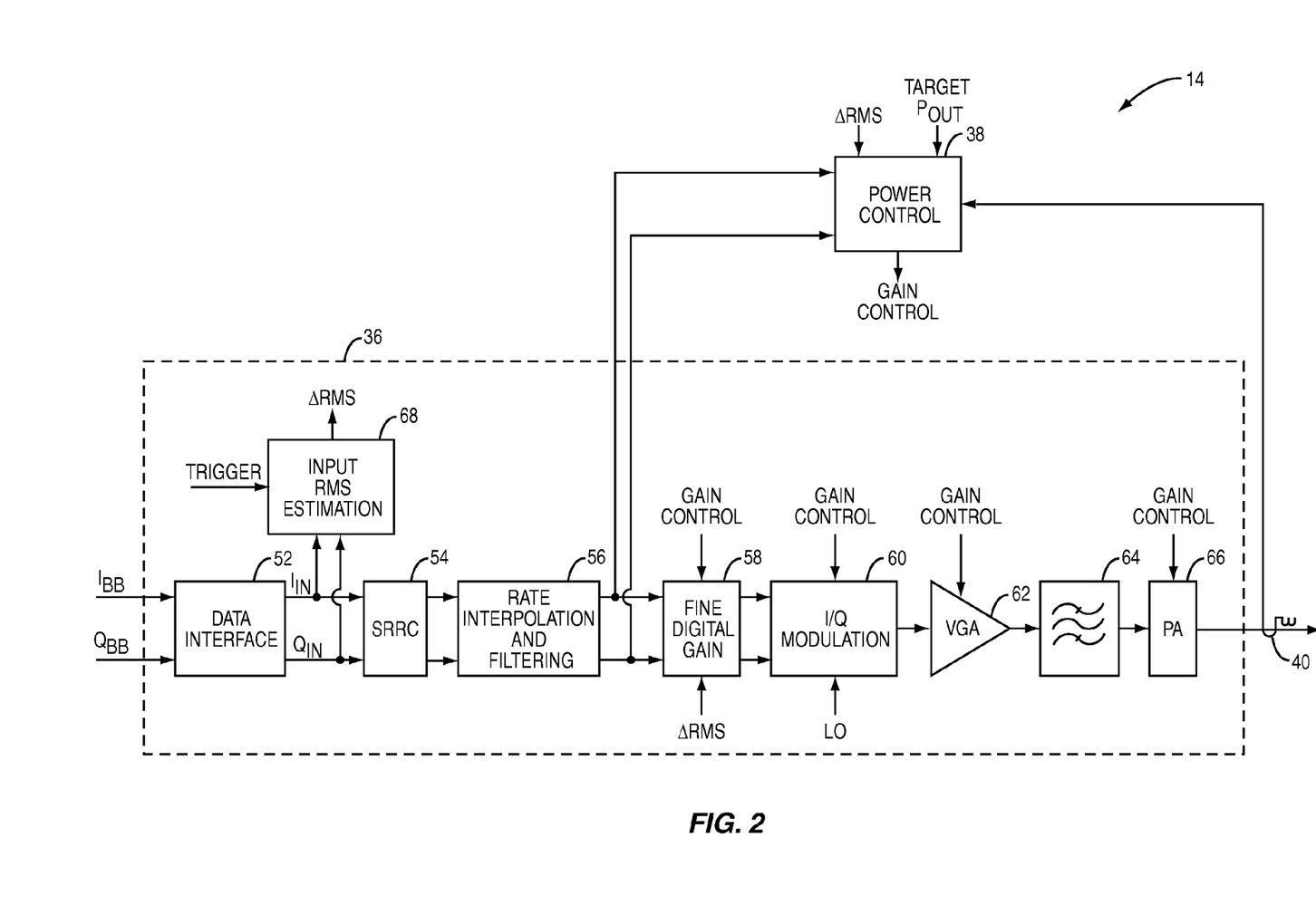
FIG. 2 is a more detailed block diagram of the transmitter of FIG. 1 including input RMS estimation circuitry according to one embodiment of the present invention.

FIG. 2 is a more detailed block diagram of the radio frequency transmitter section 14 according to one embodiment of the present invention. In general, the transmit circuitry 36 includes a data interface 52 operating to receive the baseband signal $(I_{BB}, Q_{BB})$ from the baseband possessor 20 (FIG. 1). The data interface 52 is preferably a First-In-First-Out (FIFO) data interface operating to output digital samples of the baseband signal $(I_{BB}, Q_{BB})$ at a desired clock rate. For example, for a W-CDMA transmitter in the UMTS, the data interface 52 may be clocked at a clock rate of 3.84 MHz. The samples output by the data interface 52 provide a digital quadrature input signal $(I_{IN}, Q_{IN})$. A Square Root Raise Cosine (SRRC) digital filter 54 filters the input signal $(I_{IN}, Q_{IN})$ to bandlimit and shape the spectrum wherein the W-CDMA receiver at an associated base station performs similar filtering such that the total transfer function of the SRRC digital filter 54 and the corresponding filter at the receiver is equal to Root Raise Cosine, as will be apparent to one of ordinary skill in the art upon reading this disclosure.

Rate interpolation and filtering circuitry 56 processes the filtered digital signal from the SRRC digital filter 54 to interpolate the digital signal from a first clock rate to an oversampling clock rate which may be, for example, 62.4 MHz. The oversampling clock rate may be equal to a clock rate of Digital-to-Analog Converters (DACs) thereafter used to convert the digital signal to an analog signal prior to upconversion and amplification. For more details, the interested reader is directed to U.S. patent application Ser. No. 11/459,812, entitled OVERSAMPLING RATE CONVERTER WITH TIMING CONTROL FOR A DIGITAL RADIO FREQUENCY TRANSMITTER MODULATOR, which was filed Jul. 25, 2006 and is hereby incorporated herein by reference in its entirety.

In this example, the fine digital gain circuitry 58 operates to scale, or adjust the gain of, the output of the rate interpolation and filtering circuitry 56 based on an RMS correction value (ΔRMS) and a gain control value (GAIN CONTROL). The output of the fine digital gain circuitry 58 is provided to I/Q modulation circuitry 60 which operates to convert the digital signal into an analog baseband signal using a DAC for each of the components I and Q of the digital signal. The I/Q modulation circuitry 60 then upconverts the analog baseband signal to a desired radio frequency using a local oscillator signal (LO) from the frequency synthesizer 26 and combines the quadrature components of the upconverted analog signal to provide a combined analog signal. The combined analog signal is then provided to a variable gain amplifier (VGA) 62, which may be controlled by the power control circuitry 38 via the gain control signal (GAIN CONTROL) in order to control or assist in the control of the output power of the radio frequency transmitter section 14. The output of the VGA 62 is then filtered by filtering circuitry 64 and provided to power amplifier circuitry 66 where the signal is amplified to the desired output power level for transmission.

The operation of the power control circuitry 38 is discussed in detail in U.S. patent application Ser. No. 11/113,873, entitled POWER CONTROL SYSTEM FOR A CONTINUOUS TIME MOBILE TRANSMITTER, which was filed on Apr. 25, 2005 and has been incorporated herein by reference in its entirety. In general, the power control circuitry 38 operates to control a gain of the transmit circuitry 36 based on a detected signal from the coupler 40. The detected signal is indicative of the signal output by the power amplifier circuitry 66 and therefore transmitted by the mobile terminal 10 (FIG. 1). An amplitude modulation component is removed from the detected signal using a delayed version of the corresponding baseband quadrature signal from, for example, the rate interpolation and filtering circuitry 56, thereby providing a measurement of the gain of the transmit circuitry 36. Based on the measured gain, the power control circuitry 38 controls the gain of the transmit circuitry 36 such that the output of the transmit circuitry 38 is within an acceptable range for a target output power level. The power control circuitry 38 may control the gain of the transmit circuitry 36 by, for example, controlling the gain of the power amplifier circuitry 66, activating or deactivating stages of the power amplifier circuitry 66, controlling the gain of the VGA 62, controlling the gain of the I/Q modulation circuitry 60, and/or controlling a gain of the fine digital gain circuitry 58 using one or more gain control signals (GAIN CONTROL). The gain may additionally or alternatively be controlled by controlling a DC/DC converter, voltage regulator, or the like controlling a supply voltage provided to the power amplifier circuitry 66.

The W-CDMA transmit scheme requires that output power be controlled to within ±0.5 dB of a target output power, where the target output power may be provided by an associated base station. Further, continuous time transmit schemes, such as W-CDMA, require that output power correction be performed during a predetermined time period during each time slot. For W-CDMA, the output power must be corrected during the first 50 microseconds of each time slot. Thus, in one embodiment, the power control circuitry 38 operates to detect and correct the gain of the transmit circuitry 36 within 50 microseconds at the beginning of each transmit slot. In another embodiment, the power control circuitry 38 operates to detect and correct the gain of the transmit circuitry 36 within 20 microseconds at the beginning of the transmit slot.

Since the power control circuitry 38 controls the output power of the transmitter circuitry 36 and thus the output power of the mobile terminal 10 by controlling the gain the of transmitter circuitry 36, the output power is sensitive to variations in the RMS value of the input signal ($I_{IN}$, $Q_{IN}$). More specifically, the output power of the transmitter circuitry 36 is the product of the RMS value of the input signal ($I_{IN}$, $Q_{IN}$) and the gain of the transmitter circuitry 36. Thus, even if gain is accurately controlled, variations in the RMS value of the input signal ($I_{IN}$, $Q_{IN}$) result in variations in output power. Further, due to the effects of multi-code operation, the RMS value of the input signal ($I_{IN}$, $Q_{IN}$) varies significantly. Multi-code operation is discussed below in detail. Thus, there is a need to control the RMS value of the input signal ($I_{IN}$, $Q_{IN}$) or to compensate for variations in the RMS value of the input signal ($I_{IN}$, $Q_{IN}$).

According to the present invention, input RMS estimation circuitry 68 operates to measure the RMS value of the input signal ($I_{IN}$, $Q_{IN}$) and provide the RMS correction value (ΔRMS) corresponding to an error between the measured RMS value and a desired, or ideal, RMS value. However, note that the input RMS estimation circuitry 68 may alternatively estimate the mean power of the input signal ($I_{IN}$, $Q_{IN}$) since the RMS value is equal to the square root of the mean power of the input signal. The correction value (ΔRMS) may then be applied to, for example, the fine digital gain circuitry 58 to compensate for the RMS error. The correction value (ΔRMS) may additionally or alternatively be provided to the power control circuitry 38 such that the RMS error is compensated for during power control. In addition or alternatively, the RMS error correction may be performed in the analog domain by adjusting the gain of the I/Q modulation circuitry 60, by adjusting the gain of the VGA 62, by controlling a gain of the power amplifier circuitry 66, or any combination thereof. The details of the operation of the input RMS estimation circuitry 68 are described below in detail.

Figure 3:
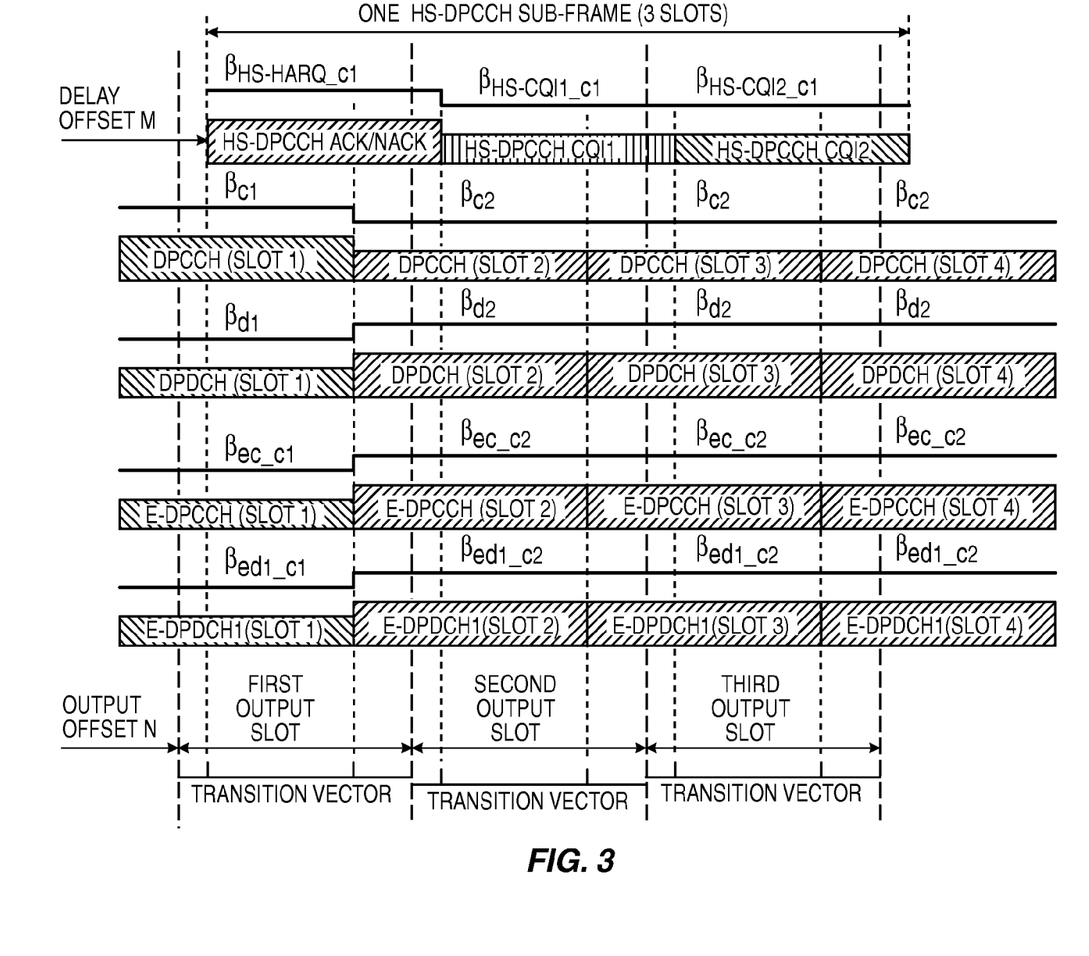
FIG. 3 illustrates the various multi-code channels that may be transmitted by a Wideband Code Division Multiple Access (W-CDMA) transmitter in the Universal Mobile Telecommunications System (UMTS)

Before discussing the operation of the input RMS estimation circuitry 68, it may be beneficial to discuss multi-code operation of W-CDMA. As illustrated in FIG. 3, various channels, which are referred to herein as multi-code channels, may simultaneously be transmitted during W-CDMA operation using orthogonal spreading codes. The spreading codes are orthogonal over the period of the spreading codes which may be, for example, 256 chips. The illustrated channels are those of W-CDMA in the UMTS. However, the present invention is not limited thereto. The channels include a High Speed Dedicated Physical Control Channel (HS-DPCCH), a Dedicated Physical Control Channel (DPCCH), a Dedicated Physical Data Channel (DPDCH), an Enhanced Dedicated Physical Control Channel (E-DPCCH), and an Enhanced Dedicated Physical Data Channel (E-DPDCH). Each of the channels has an associated controllable gain factor $\beta_{XXX}$.

During multi-code operation, two or more of the channels may be combined by the baseband processor 20 (FIG. 1) to provide the baseband signal ($I_{BB}$, $Q_{BB}$), and thus the input signal ($I_{IN}$, $Q_{IN}$), using orthogonal spreading codes. For example, the DPCCH may be spread using a first spreading code, the HS-DPCCH may be spread using a second spreading code that is orthogonal to the first spreading code, and the DPCCH and the HS-DPCCH may then be combined to provide the quadrature, or imaginary, component of the baseband signal ($I_{BB}$, $Q_{BB}$). The DPDCH may be spread using a third spreading code to provide the in-phase, or real, component of the baseband signal ($I_{BB}$, $Q_{BB}$).

As a result of the multi-code operation and more specifically of transport format changes (TFCs), the RMS value of the baseband signal ($I_{BB}$, $Q_{BB}$), and thus the RMS value of the input signal ($I_{IN}$, $Q_{IN}$), may vary significantly. A TFC may be a change in the combination of transmitted multi-code channels and/or changes in the gain factors ($\beta_{XXX}$) of the transmitted multi-code channels. For example, the RMS value may change as a result of changing the combination of transmitted multi-code channels from the DPDCH and the DPCCH to the DPDCH, the DPCCH, and the HS-DPCCH. In addition, the RMS value may further vary as a result of changes in the gain factors ($\beta_{XXX}$) of the transmitted multi-code channels.

Figure 4:
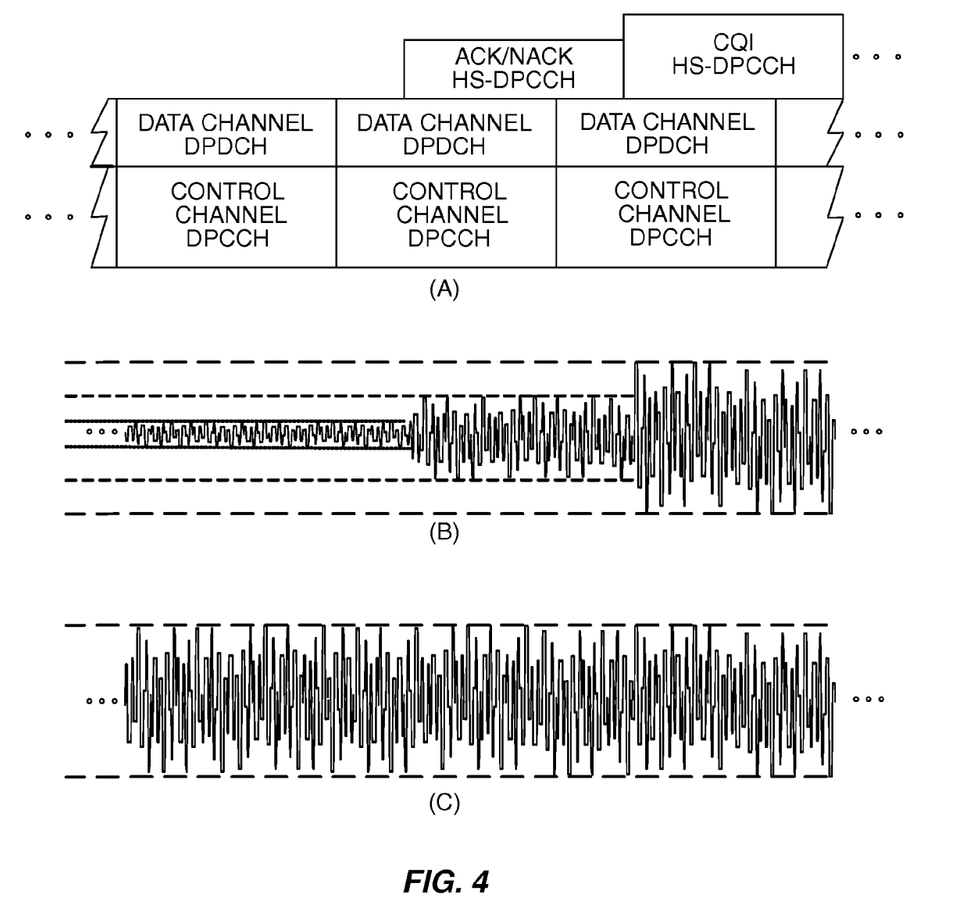
FIG. 4 is an exemplary illustration showing variations in the RMS value of an input signal due to multi-code operation.

FIG. 4 illustrates the variation of the RMS value due to changes in the transmitted multi-code channels. More specifically, FIG. 4(*a*) illustrates transmitted multi-code channels over several transmit slots. As illustrated in FIG. 4(*b*), the RMS value of the analog version of the baseband signal ($I_{BB}$, $Q_{BB}$) varies as a result of changes in the transmitted multi-code channels. As shown, at first, the DPDCH and the DPCCH are transmitted. Then, the HS-DPCCH is added at which time there is a change in the RMS value of the signal.

Another variation in the RMS value occurs when the gain of the HS-DPCCH is changed from a first value when transmitting ACK/NACK information to a second value when transmitting CQI information.

FIG. 4(c) illustrates the analog version of the baseband signal ($I_{BB}$, $Q_{BB}$) after optional baseband scaling processing is performed by the baseband processor 20 to compensate for the variations in RMS described above. However, even when this scaling is performed, a small RMS error still exists due to, for example, the bit resolution used for the gain values ($\beta_{xxx}$) for the multi-code channels.

In order to correct the RMS error resulting from multi-code operation, the RMS value of the input signal ($I_{IN}$, $Q_{IN}$) is measured. However, one issue with measuring the RMS is that a residual error is introduced due to multi-code operation. The residual error corresponds to a product error term. In order to understand the product error term, it may be beneficial to first consider the RMS of a signal generally. Considering two signals Sig1 and Sig2 that are centered and carry independent data and are summed to provide a combined signal, Sig, the mean power of Sig, which is the RMS value of Sig squared, is:

$$PWR\_Sig = \text{mean}(|Sig|^2) = \text{mean}(|Sig1|^2 + |Sig2|^2 + 2Re\{Sig1 * conj(Sig2)\}).$$

Since Sig1 and Sig2 carry independent data and are centered, the mean of Sig1*Sig2 is equal to zero. Therefore, $$PWR\_Sig = PWR\_Sig1 + PWR\_Sig2.$$

Now, when average power is estimated by averaging $|Sig|^2$ over N samples, the term $2\,Re\{Sig1*conj(Sig2)\}/N$ is not exactly equal to zero. This product error term results in a residual error in the average power estimate and thus RMS. Further, if the signals Sig1 and Sig2 have constant envelopes, the residual error is made only of the term $2\,Re\{Sig1*conj(Sig2)\}/N$.

In a similar fashion, a residual error is introduced when measuring the RMS of the input signal ($I_{BB}$, $Q_{BB}$). More specifically, if, for example, two multi-code channels are combined to provide the imaginary component $Q_{BB}$ of the baseband signal, then the residual term $2\,Re\{Sig1*conj(Sig2)\}/N$ introduces an error in the RMS measurement, where Sig1 is the first multi-code channel and Sig2 is the second multi-code channel. However, the residual term becomes zero if samples of the baseband signal, and more specifically the imaginary component $Q_{BB}$, are accumulated over the length of the shortest of the two orthogonal spreading codes for the two multi-code channels. Thus, $$\sum_{i=0}^{i=SF-1} 2\,Re\{Sig1_i * conj(Sig2_i)\}/N,$$

where SF is the length of the shortest of the spreading codes for the multi-code channels.

Traditionally, RMS or power of such a signal is measured by accumulating, or integrating, over one complete spreading code cycle. Thus, for example, if the spreading codes for the two multi-code channels have lengths of 256 chips, then the RMS value or power of the signal would be measured by accumulating over the entire 256 chip spreading code period in order to reduce the residual term to zero. For W-CDMA in the UMTS system, the measurement would require 66.7 microseconds. Since the power correction is desired to be performed within the first 20-50 microseconds of each transmit slot, the traditional method is unacceptable. However, using the inventive measurement scheme, the RMS measurement may be accurately obtained in approximately 2 microseconds.

According to the present invention, the RMS value of the input signal ($I_{IN}$, $Q_{IN}$) may be measured by accumulating over a period corresponding to mutually orthogonal segments of the spreading codes used for the transmitted channels. Due to the mutual orthogonality of the segments of the spreading codes, the residual error becomes zero. As such, the RMS measurement may be made without accumulating over an entire spreading code. For example, for W-CDMA in the UMTS, an accumulation over only 8 chips, rather than the entire spreading code period, may be used to measure the RMS value of the input signal ($I_{IN}$, $Q_{IN}$). Accordingly, the RMS measurement may be made in approximately 2 microseconds.

Figure 5A:
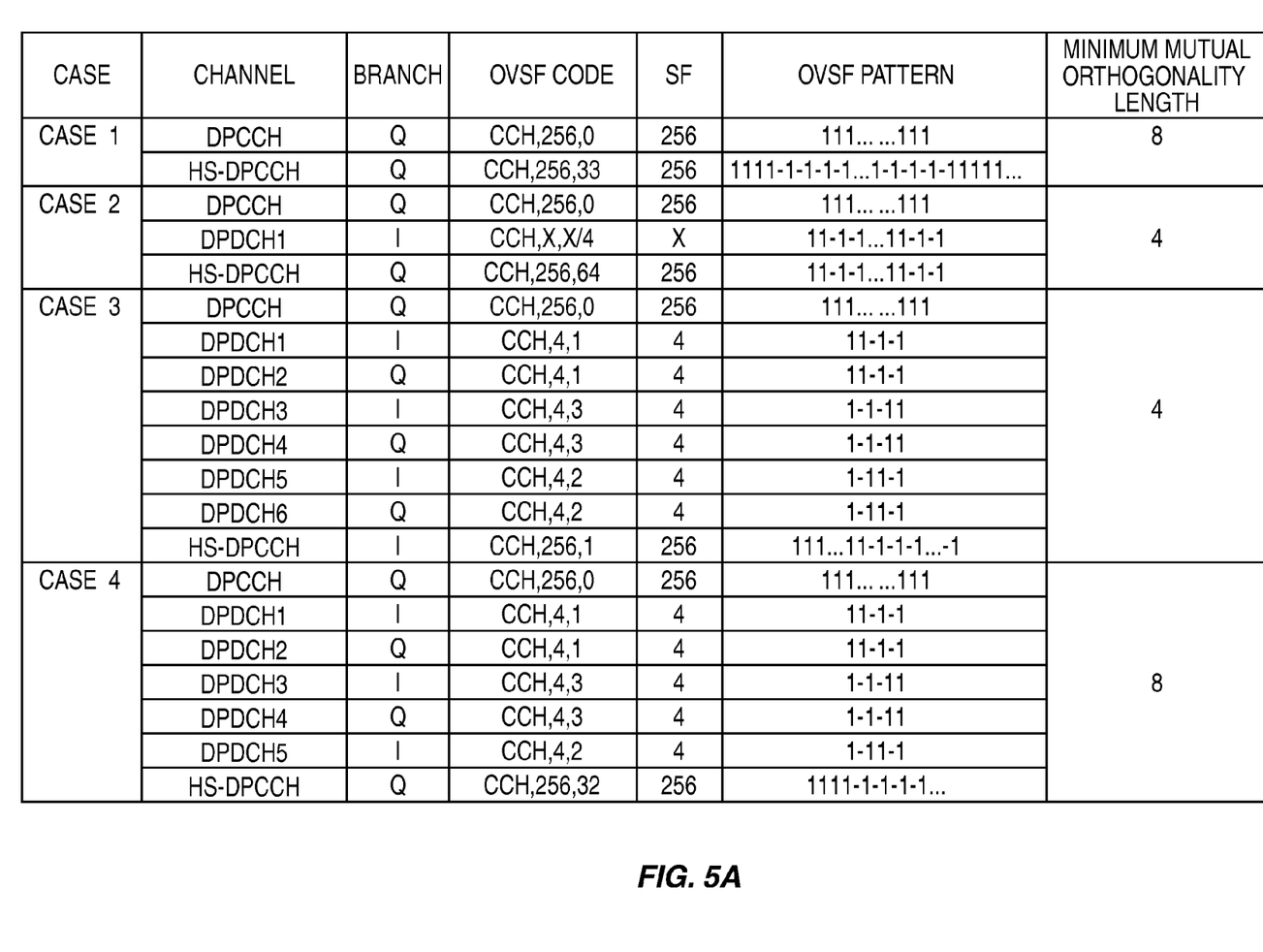
FIGS. 5A-5C show a table illustrating the mutual orthogonal segments of the spreading codes for the various multicode channel combinations in the UMTS.
Figure 5B:
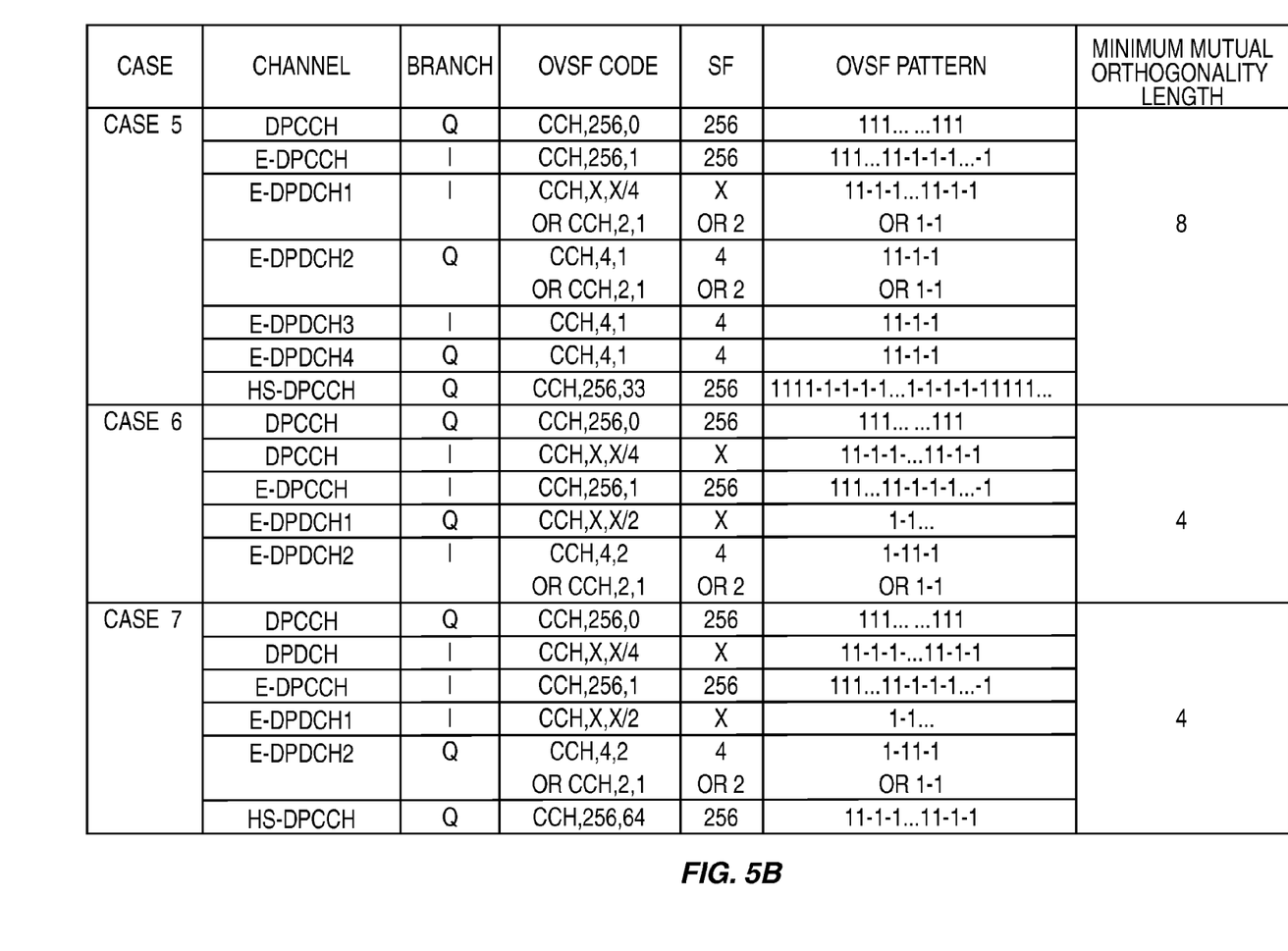
Figure 5C:
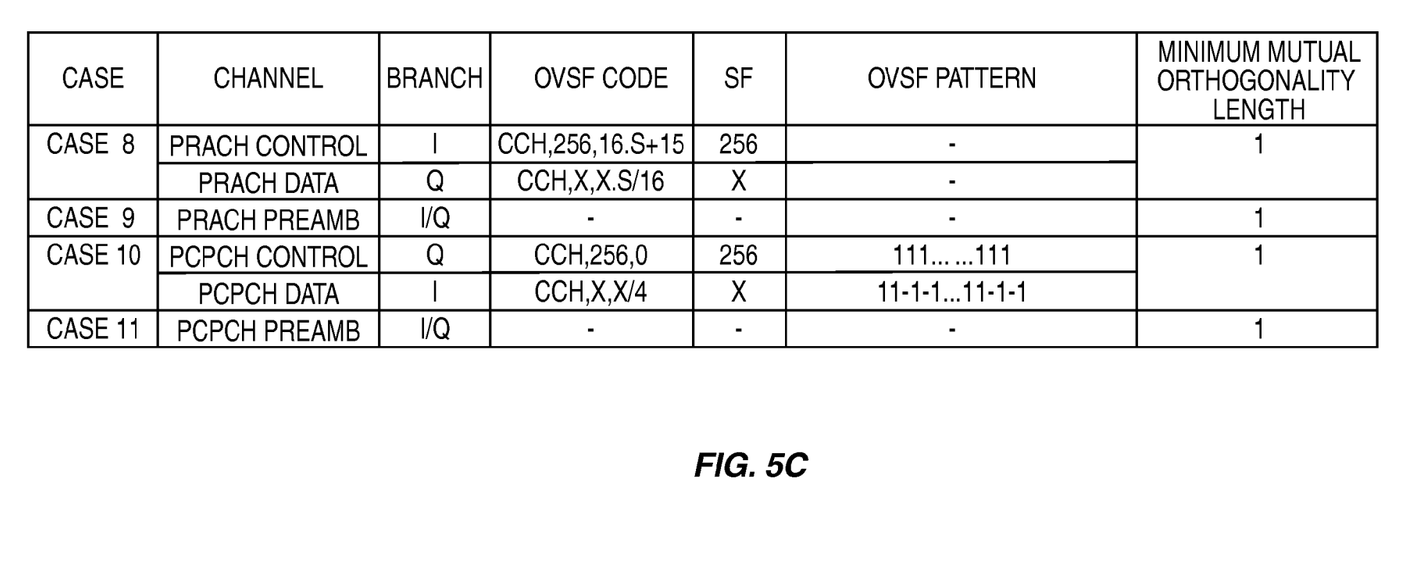

More specifically, FIGS. 5A-5C show a table illustrating all possible multi-channel combinations for W-CDMA in the UMTS. Thus, looking at "Case 1," the multi-code channels DPCCH and HS-DPCCH are combined to provide the imaginary component $Q_{BB}$ of the baseband signal provided to the radio frequency transmitter section 14. The DPCCH is spread by a spreading code having a length of 256 chips and having a pattern of 111 . . . 111. The HS-DPCCH is spread by a spreading code having a length of 256 chips and having a pattern of 1111-1-1-1 . . . -1-1-1-11111. Thus, as used herein, the DPCCH and the HS-DPCCH are mutually orthogonal over a minimum chip length of 8. More specifically, starting at the first chip of the two spreading codes or any multiple of eight chips therefrom, the two spreading codes are mutually orthogonal. Likewise, in "Case 2," the multi-code channels are mutually orthogonal over a minimum chip length of 4 starting from the first chips of the spreading codes or any multiple of 4 therefrom. Thus, by examining all of the possible multi-code channel combinations, mutual orthogonality for any of these combinations is obtained over a chip length of 8 starting from the first chips of the spreading codes or any multiple of 8 chips therefrom. Thus, starting from the 1st chip, the 8th chip, the 16th chip, or any subsequent multiple of eight chips, the spreading codes for any multi-code channel combination are mutually orthogonal. As a result, as discussed below, an accumulation of samples of amplitude, or magnitude, of the input signal ($I_{IN}$, $Q_{IN}$) over a period corresponding to the mutually orthogonal segments of the spreading codes forces the residual error, or the RMS measurement error, to zero.

Figure 6:
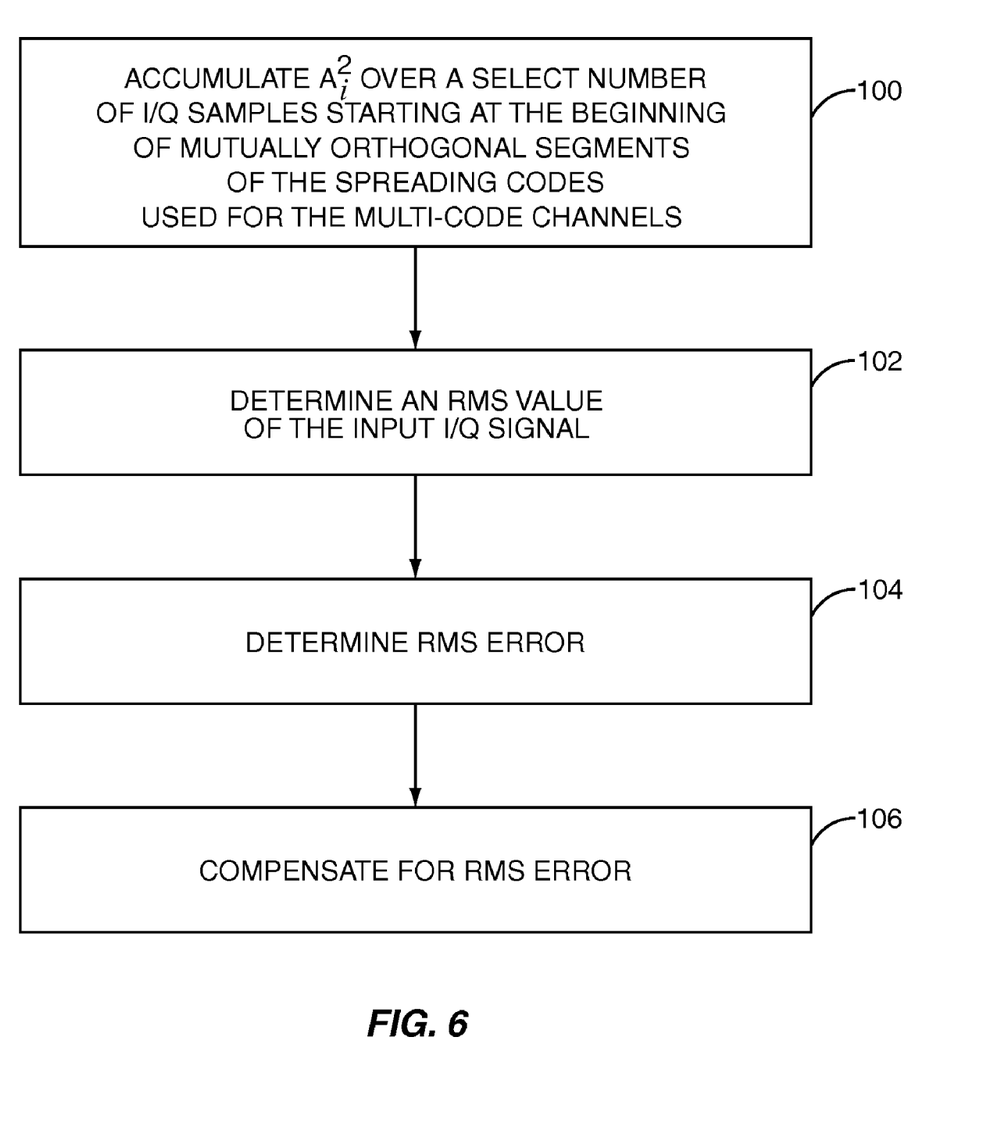
FIG. 6 illustrates the operation of the input RMS estimation circuitry of FIG. 2 according to one embodiment of the present invention.

FIG. 6 illustrates the operation of the input RMS estimation circuitry 68 according to one embodiment of the present invention. First, a value $A_i^2$ is accumulated for a select number of samples of the input signal ($I_{IN}$, $Q_{IN}$) starting at the beginning of mutually orthogonal segments, or patterns, of the spreading codes of the transmitted multi-code channels (step 100). The value $A_i^2$ is the square of an amplitude or magnitude ($A_i$) of the corresponding sample of the input signal ($I_{IN}$, $Q_{IN}$) and may be represented as:

$$A_i^2 = I_{IN}^2 + Q_{IN}^2.$$

As discussed above with respect to FIG. 5, for W-CDMA in the UMTS, the value $A_i^2$ may be accumulated using samples of the input signal ($I_{IN}$, $Q_{IN}$) over an 8 chip period starting at the first chip of the transmit slot or any multiple of 8 chips therefrom during which the spreading codes for the multi-code channels are mutually orthogonal.

The RMS value of the input signal ($I_{IN}$, $Q_{IN}$) may be determined based on the accumulation of the value $A_i^2$ (step 102). More specifically, the RMS value may be determined based on the equation:

$$RMS = \sqrt{\frac{\sum_{i=1}^{N} A_i^2}{N}},$$

where RMS is the RMS value of the input signal ($I_{IN}$, $Q_{IN}$) and N is the number of samples accumulated for the mutually orthogonal segments of the spreading codes used for the transmitted multi-code channels.

At this point, the RMS value of the input signal ($I_{IN}$, $Q_{IN}$) determined in step 102 may be compared to a desired, or optimal, RMS value to determine an RMS error (step 104). The RMS error may then be corrected, or compensated for, using the RMS correction value (ΔRMS) (step 106). As discussed above, the RMS correction value (ΔRMS) may be applied to, for example, the fine digital gain circuitry 58 (FIG. 2) in order to correct or compensate for the RMS error in the digital domain. In addition or alternatively, the RMS correction value (ΔARMS) may be used to adjust the gain of the I/Q modulation circuitry 60, the gain of the VGA 62, a bias of the power amplifier circuitry 66, a supply voltage supplied to the power amplifier circuitry 66, or the like in order to correct or compensate for the RMS error in the analog domain. In addition or alternatively, the RMS error or the RMS correction value (ΔRMS) may be provided to the power control circuitry 38 in order to compensate for the RMS error.

As an example, consider Case 2 of the table of FIG. 5 where three multi-code channels are used and two of the multi-code channels, DPCCH and HS-DPCCH, are combined on the quadrature path. The RMS value may be determined based on the equation:

$$RMS = \sqrt{\frac{\sum_{i=1}^{N} A_i^2}{N}},$$

where $$A_i^2 = I_{IN}^2 + Q_{IN}^2.$$

Thus, $$RMS = \sqrt{\frac{\sum_{i=1}^{N} (I_{IN,i}^2 + Q_{IN,i}^2)}{N}}$$

$I_{IN,i}^2$ is the square of the samples of $I_{IN}$, and $Q_{IN,i}^2$, is the square of the samples of $Q_{IN}$. Since for Case 2 the in-phase, or real, component ($I_{IN}$) of the input signal ($I_{IN}$, $Q_{IN}$) is formed by only one channel, no residual error term is introduced by the in-phase component ($I_{IN}$). However, since the quadrature, or imaginary, component ($Q_{IN}$) is formed by combining two multi-code channels, a residual error term is introduced. More specifically, taking the square of $Q_{IN}$ results in the terms DPCCH² + HS-DPCCH² + 2*DPCCH*HS-DPCCH. The DPCCH has a 256 chip spreading code having a spreading code pattern of 1111 ... 1111, and the HS-DPCCH has a 256 chip spreading code having a spreading pattern of 11-1-1 ... 11-1-1. The mutual term 2*DPCCH*HS-DPCCH is equal to $β_C*β_{HS}*[1*1, 1*1, 1*1, 1*1, 1*-1, 1*-1, 1*-1, 1*-1, ...]$. $β_C$ is the gain for the DPCCH and is constant for a given transmit slot, and $β_{HS}$ is the gain for the HS-DPCCH and is constant for a given transmit slot. Again, the mutual term is the source of the residual RMS measurement error. However, by accumulating over 8 samples, or 8 chips of the spreading codes, over a period corresponding to the mutually orthogonal segments of the spreading codes, the mutual term and thus the residual error of the RMS measurement becomes $β_C*β_{HS} + β_C*β_{HS} + β_C*β_{HS} + β_C*β_{HS} - β_C*β_{HS} - β_C*β_{HS} - β_C*β_{HS} - β_C*β_{HS}$, which is equal to zero.

Note that the boundary or start of the HS-DPCCH may be offset in time with respect to the boundary or start of the DPCCH. However, the offset is a multiple of 256 chips (256*M, where M=0 ... 10). Thus, the offset is a multiple of 8 from the beginning of the DPCCH transmit slot. Therefore, the spreading codes for the HS-DPCCH and the DPCCH have mutually orthogonal 8 chip segments starting at the first chip of the HS-DPCCH or some multiple of 8 chips from the first chip of the HS-DPCCH.

While the discussion above focuses on correcting RMS error for accurate power control via gain control, the present invention may be used to correct input RMS even if gain control is not desired. This may particularly be the case when there is no baseband scaling to compensate for variations in RMS due to multi-code operation.

Those skilled in the art will recognize improvements and modifications to the preferred embodiments of the present invention. All such improvements and modifications are considered within the scope of the concepts disclosed herein and the claims that follow.

What is claimed is:

1. A method of obtaining a power measurement of a digital quadrature signal input to a mobile transmitter comprising:
   receiving a digital quadrature signal comprising a real component and an imaginary component, at least one of the real component and the imaginary component comprising a plurality of multi-code channels spread using orthogonal spreading codes;
   sampling the digital quadrature signal over a period corresponding to mutually orthogonal segments of the orthogonal spreading codes;
   determining a desired power measurement value based on the samples of the digital quadrature signal by determining a Root Mean Square (RMS) value of the digital quadrature signal based on the samples of the digital quadrature signal;
   comparing the RMS value to a desired RMS value to determine an RMS error; and
   compensating for the RMS error;
   detecting a gain of the mobile transmitter; and
   controlling an output power of the mobile transmitter based on the gain of the mobile transmitter;
   wherein compensating for the RMS error of the digital quadrature signal enables accurate control of the output power of the mobile transmitter based on the gain of the mobile transmitter.

2. The method of claim 1 wherein a length of the mutually orthogonal segments of the orthogonal spreading codes is less than a length of the orthogonal spreading codes.

3. The method of claim 1 wherein the mobile transmitter is a Wideband Code Division Multiple Access (W-CDMA) transmitter in the Universal Mobile Telecommunications System (UMTS), and sampling the digital quadrature signal comprises sampling the digital quadrature signal over an eight chip period starting with a first chip of a transmit slot.

4. The method of claim 1 wherein the mobile transmitter is a Wideband Code Division Multiple Access (W-CDMA) transmitter in the Universal Mobile Telecommunications System (UMTS), and sampling the digital quadrature signal comprises sampling the digital quadrature signal over an eight chip period starting with a chip located 8*N chips from the beginning of a transmit slot, wherein N=0, 1, 2, . . . .

5. A method of obtaining a power measurement of a digital quadrature signal input to a mobile transmitter comprising:
receiving a digital quadrature signal comprising a real component and an imaginary component, at least one of the real component and the imaginary component comprising a plurality of multi-code channels spread using orthogonal spreading codes;
sampling the digital quadrature signal over a period corresponding to mutually orthogonal segments of the orthogonal spreading codes; and
determining a desired power measurement value based on the samples of the digital quadrature signal by accumulating a value $A_i^2$ for the samples of the digital quadrature signal over the period corresponding to the mutually orthogonal segments of the orthogonal spreading codes, the value $A_i^2$ defined by the equation:

$$A_i^2 = I_{IN}^2 + Q_{IN}^2,$$

where $I_{IN}$ is the real component of the digital quadrature signal and $Q_{IN}$ is the imaginary component of the digital quadrature signal.

6. The method of claim 5 wherein the imaginary component ($Q_{IN}$) comprises a plurality of multi-code channels spread using orthogonal spreading codes such that the term $Q_{IN}^2$ comprises at least one product term 2·Channel$_X$·Channel$_Y$, and the mutually orthogonal segments are segments of the orthogonal spreading codes forcing the at least one product term to zero.

7. The method of claim 5 wherein the real component ($I_{IN}$) comprises a plurality of multi-code channels spread using orthogonal spreading codes such that the term $I_{IN}^2$ comprises at least one product term 2·Channel$_X$·Channel$_Y$, and the mutually orthogonal segments are segments of the orthogonal spreading codes forcing the at least one product term to zero.

8. The method of claim 5 wherein determining the desired power measurement value further comprises determining a Root Mean Square (RMS) value for the digital quadrature signal based on the accumulated value.

9. The method of claim 5 wherein determining the desired power measurement value further comprises averaging the accumulated value to determine a mean power of the digital quadrature signal.

10. A mobile transmitter comprising:
a data interface adapted to receive a digital quadrature signal comprising a real component and an imaginary component, at least one of the real component and the imaginary component comprising a plurality of multi-code channels spread using orthogonal spreading codes;
transmit circuitry adapted to process samples of the digital quadrature signal from the data interface to provide an analog transmit signal at a desired radio frequency and output power level, and compensate for a Root Mean Square (RMS) error based on an RMS error correction value;
estimation circuitry adapted to:
obtain samples of the digital quadrature signal over a period corresponding to mutually orthogonal segments of the orthogonal spreading codes;
determine a desired power measurement value, which is an RMS value of the digital quadrature signal, based on the samples of the digital quadrature signal;
compare the RMS value to a desired RMS value to determine the RMS error; and
provide the RMS error correction value corresponding to the RMS error to the transmit circuitry; and
power control circuitry adapted to:
detect a gain of the transmit circuitry; and
control an output power of the transmit circuitry to achieve a desired output power level based on the gain of the transmit circuitry;
wherein compensating for the RMS error of the digital quadrature signal enables accurate control of the output power of the transmit circuitry based on the gain of the transmit circuitry.

11. The mobile transmitter of claim 10 wherein a length of the mutually orthogonal segments of the orthogonal spreading codes is less than a length of the orthogonal spreading codes.

12. The mobile transmitter of claim 10 wherein the mobile transmitter is a Wideband Code Division Multiple Access (W-CDMA) transmitter in the Universal Mobile Telecommunications System (UMTS), and the estimation circuitry is further adapted to obtain the samples of the digital quadrature signal over an eight chip period starting with a first chip of a transmit slot.

13. The mobile transmitter of claim 10 wherein the mobile transmitter is a Wideband Code Division Multiple Access (W-CDMA) transmitter in the Universal Mobile Telecommunications System (UMTS), and the estimation circuitry is further adapted to obtain the samples of the digital quadrature signal over an eight chip period starting with a chip located 8*N chips from the beginning of a transmit slot, wherein N=0, 1, 2, . . . .

14. A mobile transmitter comprising:
a data interface adapted to receive a digital quadrature signal comprising a real component and an imaginary component, at least one of the real component and the imaginary component comprising a plurality of multi-code channels spread using orthogonal spreading codes;
transmit circuitry adapted to process samples of the digital quadrature signal from the data interface to provide an analog transmit signal at a desired radio frequency and output power level; and
estimation circuitry adapted to:
obtain samples of the digital quadrature signal over a period corresponding to mutually orthogonal segments of the orthogonal spreading codes; and
determine a desired power measurement value based on the samples of the digital quadrature signal and further based on accumulating a value $A_i^2$ for the samples of the digital quadrature signal over the period corresponding to the mutually orthogonal segments of the orthogonal spreading codes, the value $A_i^2$ defined by the equation:

$$A_i^2 = I_{IN}^2 + Q_{IN}^2,$$

where $I_{IN}$ is the real component of the digital quadrature signal and $Q_{IN}$ is the imaginary component of the digital quadrature signal.

15. The mobile transmitter of claim 14 wherein the desired power measurement value is a Root Mean Square (RMS) value of the digital quadrature signal, and the estimation circuitry is further adapted to determine the RMS value based on the accumulated value.

16. The mobile transmitter of claim 14 wherein the desired power measurement value is a mean power of the digital quadrature signal, and the estimation circuitry is further adapted to determine the mean power by averaging the accumulated value.

* * * * *